United States Patent [19]

Urbanus et al.

[11] Patent Number: 5,523,803
[45] Date of Patent: Jun. 4, 1996

[54] DMD ARCHITECTURE AND TIMING FOR USE IN A PULSE-WIDTH MODULATED DISPLAY SYSTEM

[75] Inventors: Paul M. Urbanus, Dallas; Jeffrey B. Sampsell, Plano, both of Tex.

[73] Assignee: Texas Instruments Incorporated, Dallas, Tex.

[21] Appl. No.: 255,610

[22] Filed: Jun. 8, 1994

Related U.S. Application Data

[62] Division of Ser. No. 137,650, Oct. 15, 1993, Pat. No. 5,339,116, which is a division of Ser. No. 35,525, Mar. 23, 1993, Pat. No. 5,278,652, which is a continuation of Ser. No. 678,761, Apr. 1, 1991, abandoned.

[51] Int. Cl.⁶ .......................... H04N 5/74; G02B 27/00
[52] U.S. Cl. ................ 348/771; 348/770; 345/197; 365/189.12
[58] Field of Search .................... 348/714–719, 348/759, 771; 345/147, 148, 96, 98, 100, 197; 364/724.1; 365/189.12, 219–221; 341/126, 155; H04N 5/74, 3/10, 3/14

[56] References Cited

U.S. PATENT DOCUMENTS

| | | | |
|---|---|---|---|
| 4,559,535 | 12/1985 | Watkins et al. | 345/148 |
| 4,615,595 | 10/1986 | Hornbeck | 359/291 X |
| 4,680,579 | 7/1987 | Ott | 348/755 |
| 4,709,995 | 12/1987 | Kuribayashi et al. | 345/89 |
| 4,775,891 | 10/1988 | Aoki et al. | 348/572 |
| 4,811,099 | 3/1989 | Hedley et al. | 348/718 |
| 4,996,523 | 2/1991 | Bell et al. | 345/77 |
| 4,999,626 | 3/1991 | Asghar et al. | 341/126 |
| 5,034,928 | 7/1991 | Isobe | 365/230.03 |
| 5,255,100 | 10/1993 | Urbanus | 348/441 |
| 5,278,652 | 1/1994 | Urbanus et al. | 348/571 |

FOREIGN PATENT DOCUMENTS

| | | | |
|---|---|---|---|
| 206178A1 | 6/1986 | European Pat. Off. | H04N 3/10 |
| 261897A2 | 9/1987 | European Pat. Off. | H04N 3/12 |

*Primary Examiner*—James J. Groody
*Assistant Examiner*—Cheryl Cohen
*Attorney, Agent, or Firm*—Julie L. Reed; James C. Kesterson; Richard L. Donaldson

[57] ABSTRACT

It is possible to replace a standard tuning unit in a television with spatial light modulator circuitry to improve the resolution seen by the viewer. The invention herein provides a system architecture, individual part of the system and techniques for minimizing the burst data rate while maintaining a reasonable system speed. The resultant system provides better resolution with a manageable data rate and bandwidth.

10 Claims, 15 Drawing Sheets

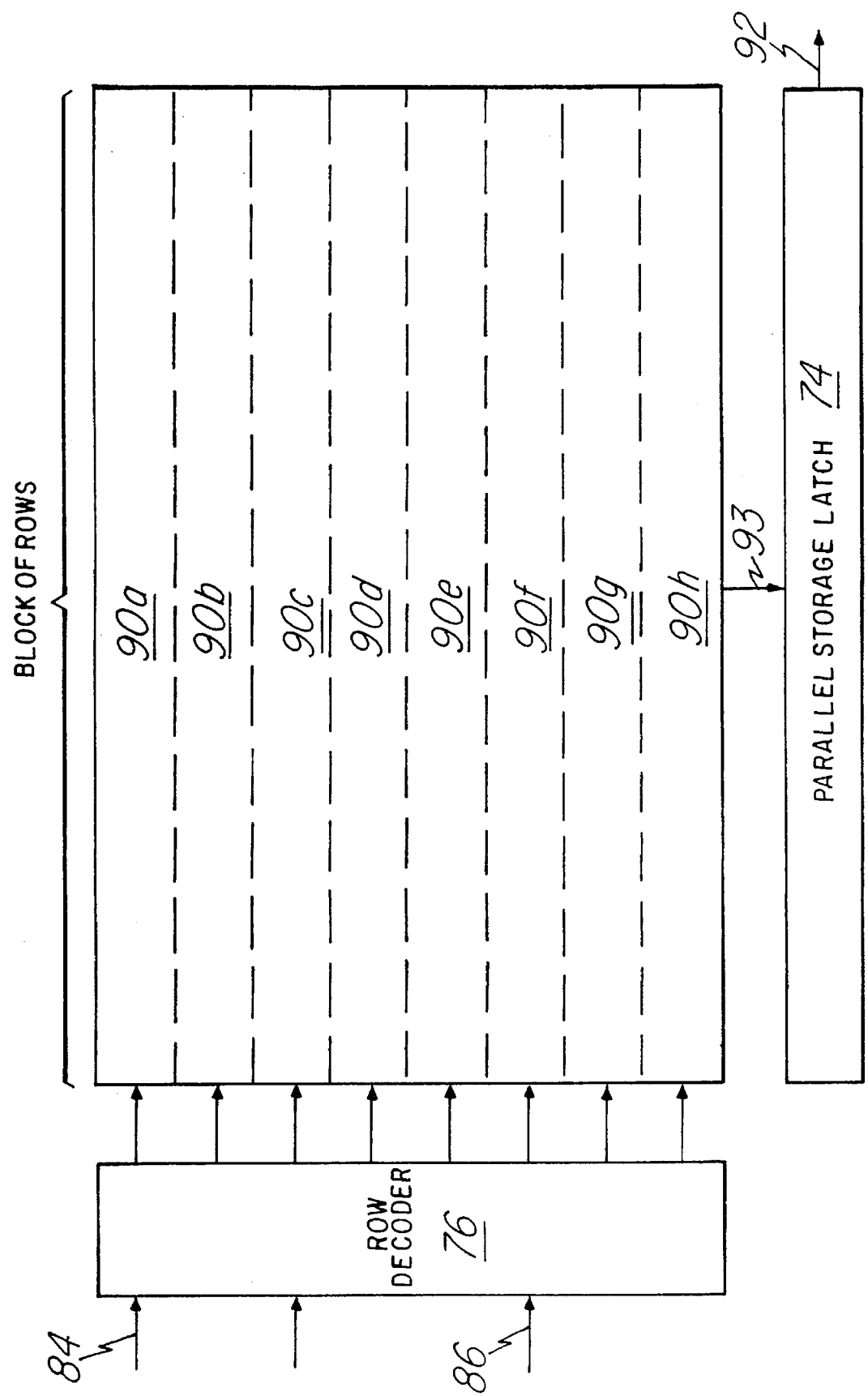

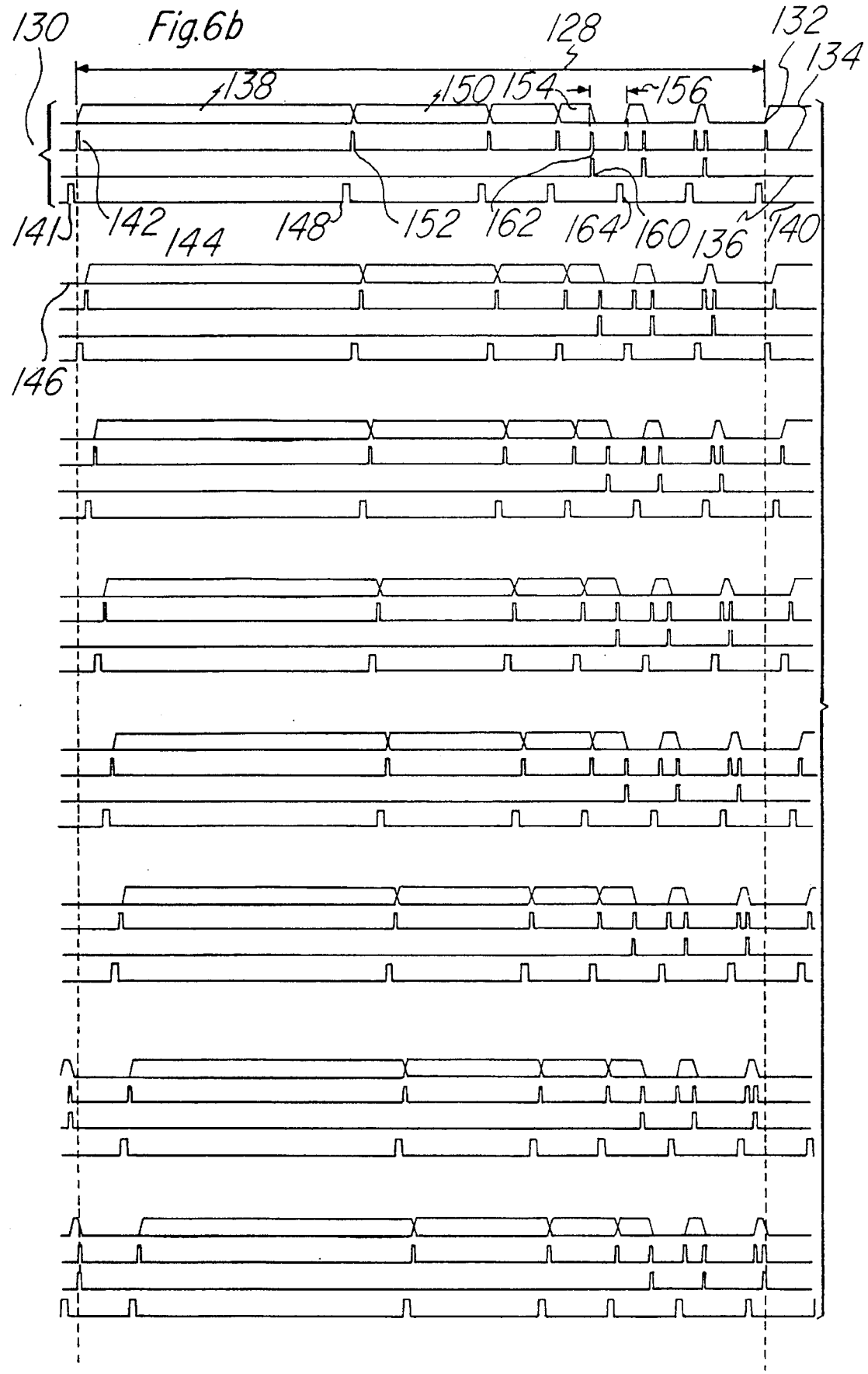

DMD ARCHITECTURE AND TIMING FOR USE IN A PULSE-WIDTH MODULATED DISPLAY SYSTEM

This is a division, of application Ser. No. 08/137,650, filed Oct. 15, 1993 now U.S. Pat. No. 5,339,116, which is a divisional of application Ser. No. 08/035,525, filed Mar. 23, 1993 (U.S. Pat. No. 5,278,652), which is a continuation of application Ser. No. 07/678,761, filed Apr. 1, 1991 (abandoned).

BACKGROUND OF THE INVENTION

1. Field of the Invention

This invention deals with light modulators, more particularly with addressing and timing techniques for systems using these modulators.

2. Description of the Prior Art

Binary light modulators possess two states. One state, corresponding to a "zero", transmits no light. The other, corresponding to a "one", transmits light at the maximum intensity for whatever system is under consideration. In short, these modulators are either OFF or ON. As a result, only two discrete light levels exist at the viewer's eye, black and maximum brightness. Intermediate levels during pixel on/off state changes are ignored as they are of relatively short duration. To achieve intermediate (similar to analog) levels of light as perceived by the viewer, pulse-width modulation (PWM) techniques are employed.

The basic PWM scheme is as follows. The rate at which the analog images are to be presented to the viewer is determined. This establishes a frame rate (frequency) and a corresponding frame time. In a standard television system, for example, images are transmitted at 30 frames per second, and each frame lasts for approximately 33.3 milliseconds.

The intensity quantization for each sampled point in the frame, or image, which maps to one picture element (pixel), is established. Assuming 6 bits of quantization, this means 1 part in 64, 63 of which are non-zero. In this example, the frame time of 33.3 msec is divided into 63 equal time slices. The resulting time slice, or least-significant-bit (LSB) time, equals 33.3 msec/63 or 528.6 microseconds.

Having established these times, all possible analog pixel intensities as seen by the viewer are scaled and quantized, such that black is 0 time slices and maximum brightness is 63 time slices. The scaled and quantized intensities set the on-time for the pixel so it is ON for the corresponding number of LSB times. In the simplest case, all pixels with a quantized value more than zero are turned ON at the beginning of a frame time, and they remain ON for the number of LSB times which correspond to their relative analog intensity. The viewer's eye will integrate the points of maximum intensity so that it would appear the same as if they were a temporally constant analog level of light.

The maximum burst bandwidth requirements for a binary modulator High Definition Television (HDTV) display using this scheme can be calculated as follows. Assuming worst case, where all pixels in a given frame will have intensity values between black and maximum brightness, all pixels will have to change at the beginning of the next frame. The LSB time can be calculated as follows:

| | |
|---|---|
| Horizontal pixels | $H = 1920$ |
| Vertical pixels | $V = 1080$ |
| Intensity levels | $I = 64$ |
| Frame rate | $F = 30$ Frames/sec |
| Colors per frame | $R = 3$ (each pixel displays each color sequentially) |

$$LSB \text{ time} = \frac{1}{F} * \frac{1}{R} * \left[ \frac{1}{I-1} \right]$$

So for these values, the LSB time would be 176.3 microseconds. In this time period, 2,073,600 pixels (1920×1080) must be loaded. The data rate is given by the following:

$$\text{Data rate} = \frac{H * V}{176.37 \, \mu\text{sec}}$$

The data rate equals 11.76 Gigabits per second. The cost of building such a system is prohibitive.

There are many ways to implement PWM to lower the effective data rate. The data can be input to the pixel in a highly parallel fashion. For example, an input shift register which is partitioned into sections of 8 pixels each, with an off-chip data input to each shift register can be added. For 1920 pixels that would be 240 shift registers, sharing a common clock. These 240 shift registers could be loaded with one row of data, using only eight clock pulses. This reduces the data rate by a factor of 240, or 49.1 Mbits/second.

Additionally, the outputs of each shift register could drive a parallel data latch. This data latch stores the contents of the input shift registers after they have been filled. This allows the input shift registers to accept a new row of data while the previously latched data is stored in the selected row of the pixel array. Consequently, the pixel array will be addressed at a rate 8 times slower than that which the input circuitry is operating. This limits the high speed circuitry needed for the pixel chip.

The input shift register/parallel latch combination can be added at the top and bottom of the array. This allows the top and bottom half of the device to be addressed simultaneously. Now each set of registers/latches need only read in half the data in a given frame time. So the data rate is fenced by another factor of two. The new input data rate is 24.55 Mbits/second, but the pin count is 480.

While these architectural changes have drastically reduced the per pin input data rate to the pixel array at the expense of increased pin count, they have also imposed a constraint on the method of addressing the pixel. While the single input method is random access, the modified architectures of this type require the pixels to be addressed a row at a time.

SUMMARY OF THE INVENTION

Other objects and advantages will be obvious, and will in part appear hereinafter and will be accomplished by the present invention which provides a system for display of visual data. The system has as its parts a receiver, a tuner unit, a projection system and optics to make the data from the receiver viewable by an observer. The projection system further comprises a signal processing unit, a decimation processor, a memory unit, and a spatial light modulator circuit, including a light source.

The received data is of some existing standardized format, which is passed to the tuner unit. The tuner isolates the video signal and provides it to the signal processing unit which performs analog-to-digital conversion and enhances the signal. The digital signals are passed to the decimation processor for conversion into a format for the memory unit. The memory unit receives and holds the data until a full frame is prepared for display. The memory unit then provides the stored digital signals to the spatial light modulator array. The spatial light modulator array deflects selected ones of said array to modulate light from the light source. The modulated light passes to the viewer through the optics.

BRIEF DESCRIPTION OF THE DRAWINGS

For a complete understanding of the invention, and the advantages thereof, reference is now made to the following description in conjunction with the accompanying drawings, in which:

FIG. 5 shows an implementation of a block-clearing architecture.

FIG. 6b shows the timing diagram for block-clearing architecture.

DETAILED DESCRIPTION OF THE PREFERRED EMBODIMENTS

Figure 1:
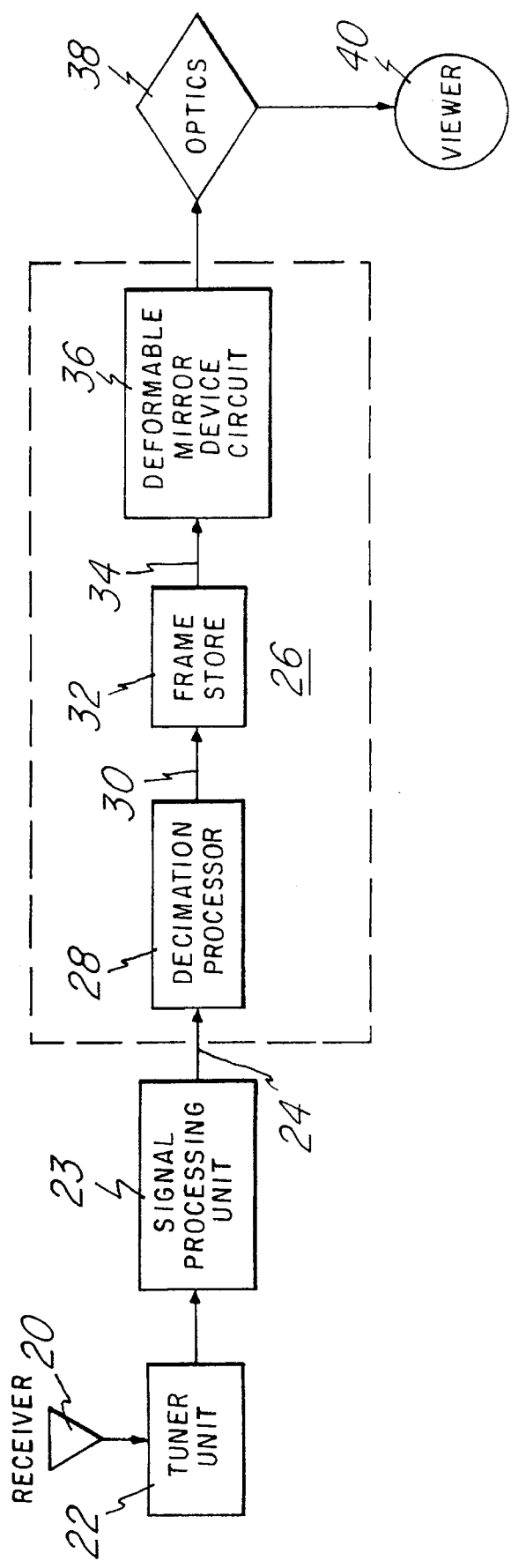
FIG. 1 shows a block representation of a television system.

FIG. 1 shows a block diagram of a preferred embodiment television system incorporating teachings of the present invention. Receiver 20 receives the television signal of some standardized format and passes it to the tuner unit 22. Tuner unit 22 splits the signal into an audio and a video component. The audio portion of the signal will not be considered further. The tuner passes the video signal into a signal processing unit 23 for analog-to-digital conversion and other enhancements. This step is only necessary if the tuner unit outputs an analog video signal. The enhanced digital signal 24 is sent to the projection system 26 which contains a decimation processor 28, a frame store 32 and a deformable mirror device circuit 36. The decimation processor converts the signal into a format for memory storage, and provides an output signal 30. This converted signal 30 then passes to the frame store circuitry where the data for each complete frame is gathered and stored. After a complete frame is stored, the data 34 is then passed to the DMD circuit 36 which generates the image through the optics 38 to the viewer 40.

Figure 2:
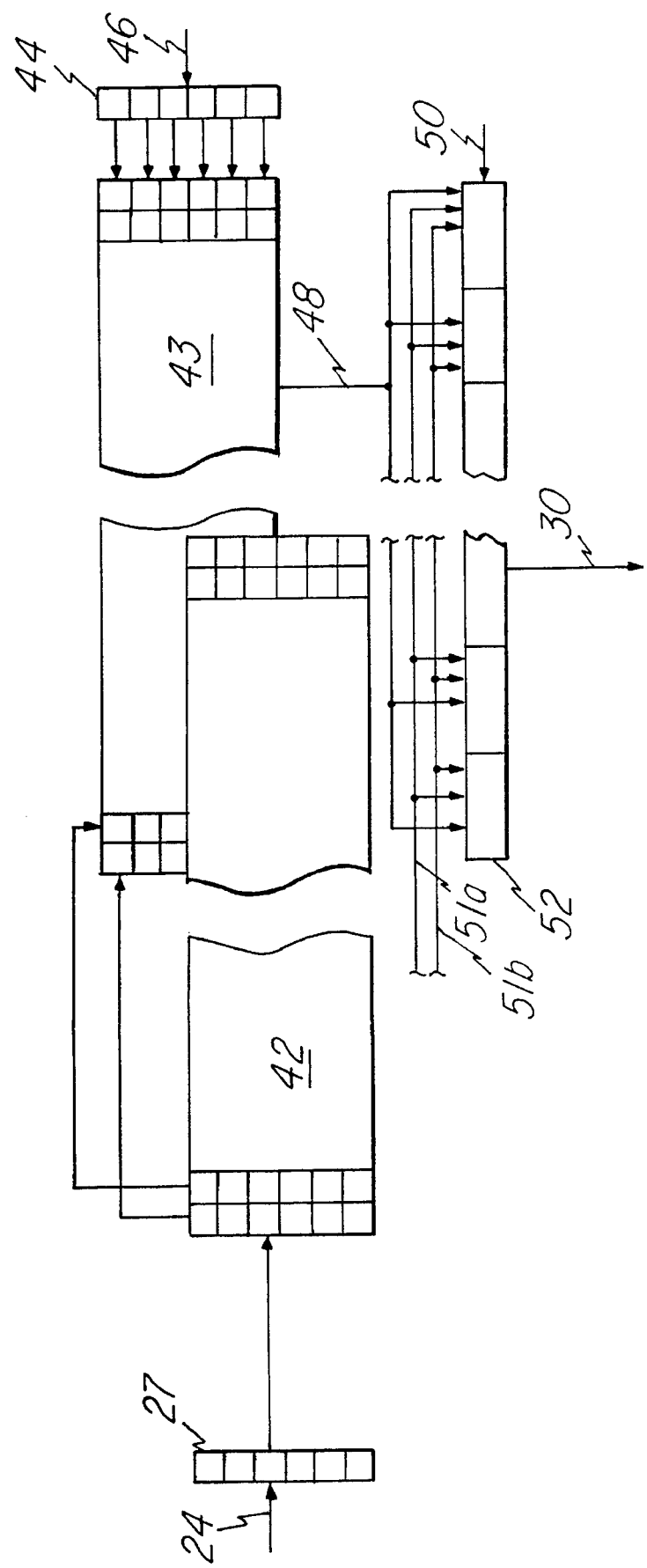
FIG. 2 shows a decimation processor.

An example of a suitable decimation processor 28 is shown in greater detail in FIG. 2. Enhanced digital data 24 enters the processor as a selected number of samples such as 6-bit samples for input register 27. For illustration purposes the system shown is 6 bits, the most-significant bit (MSB) is bit 5 and the least-significant bit (LSB) is bit 0. It is understood that these circuits could be easily set up to handle any number of bits desirable.

The 6-bit sample is then sent to a 1920×6-bit shift register 42. After the shift register 42 has been filled with 1920 data samples, the data in the shift register is passed to a directly connected "shadow memory" 43, which is also 1920×6-bits. The shadow memory 43 is considered to be an array of 6 rows, each consisting of 1920 bits. The data bits stored in any given row are of equal binary weight. For example, row 1 of the shadow memory might contain all of the bit 0 data from the 1920 input samples, row 2 has all of the bit 1 samples, etc. Each row in the shadow memory 43 is selected for readout by the output of a 1:6 decoder 44. The desired row is specified by a 3-bit select signal 46 input to the decoder. The selected row of 1920 bits from the shadow memory 43 is then applied to data bus 48 where it is sent to the data input of an array of 240 8:1 multiplexers 52. A 3-bit control signal 50 for horizontal position selection is sent simultaneously to all 8:1 multiplexers, which produce a 240-bit data stream 30. All 8 horizontal positions are sequentially selected by control signal 50.

An alternative embodiment to the 8:1 multiplexers could consist of 240 8-bit shift registers with a common clock 51b and common load control 51a. In this instance, reference number 52 would refer to an array of shift registers instead of an array of multiplexers. The selected row of 1920 bits from the shadow memory 43 is then applied to data bus 48 where it is sent to the data input of an array of 240 8:1 shift registers 52. Load control 51a is asserted to cause the contents of data bus 48 to be stored in an the array 52 of 240 individual 8-bit shift registers. Then 8 successive pulses are applied to 51b which cause the data in the shift register to be output onto data bus 30. The data stream 30 for each horizontal position passes into the frame store memory.

In both embodiments, the decimation processor 28 performs an inverse mapping function. The 1920 input samples of 6 bits each are stored in such a manner that these samples may be accessed as 6 output samples of 1920 bits. Each of the 6 output samples is then multiplexed to minimize the number of output connections from the decimation processor. This output multiplexing also serves to match the format of the data to the input data format of the DMD. The above embodiment is for a monochrome system. In order to accomplish a color system, the decimation processor can be duplicated as needed.

Figure 3A:
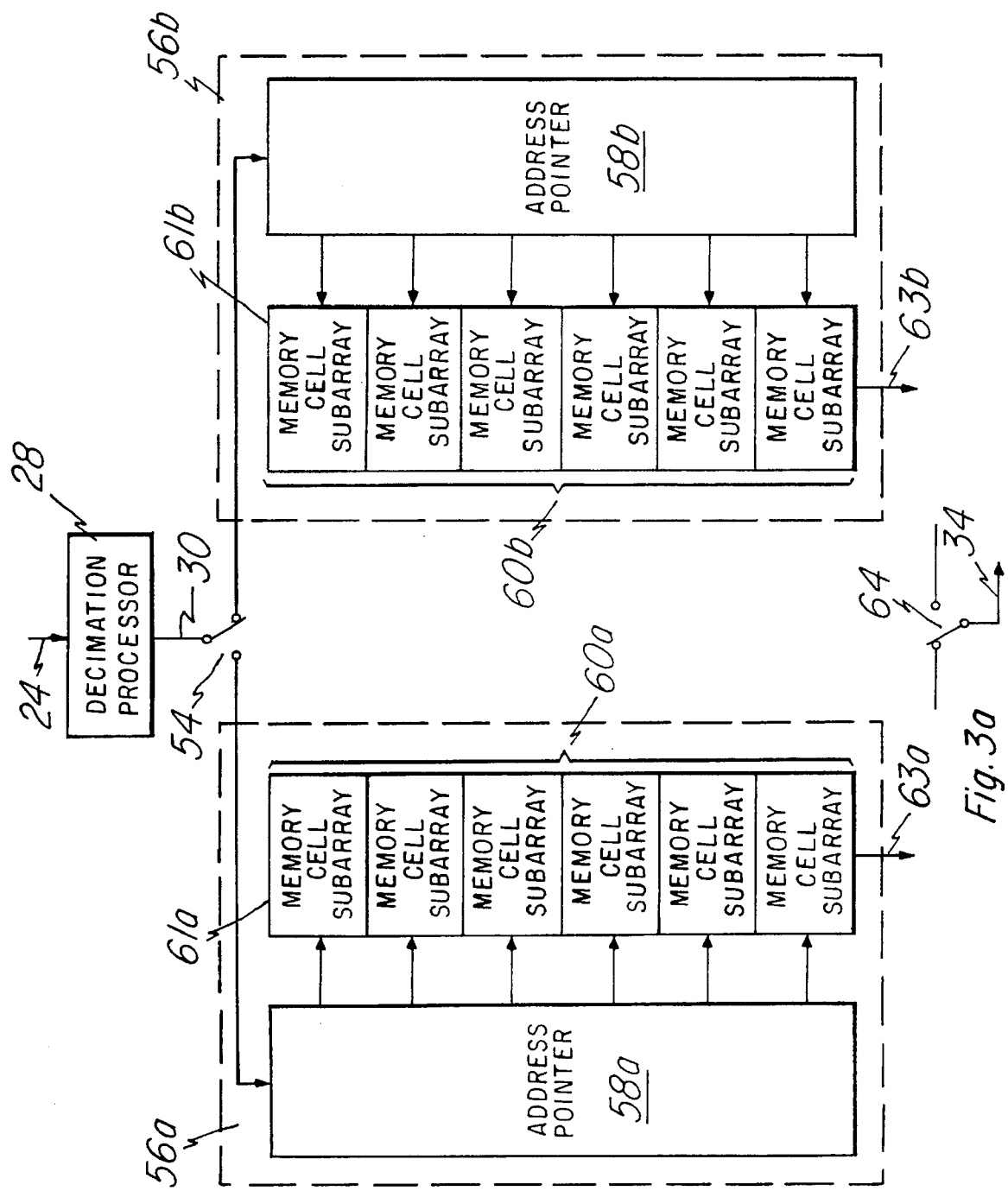
FIGS. 3a, 3b, and 3c show some frame memory schemes.

FIG. 3a shows a monochrome implementation for the frame store 32. After signal 24 is convened via decimation processor 28 and passed as signal 30 to the frame store memory, it is directed to one of two video frame memories 56a and 56b. If 56a currently is being displayed, the data stream 30 is directed by switch 54 to locations in frame memory 56b. The locations in memory cell array 60b, to which data stream 30 is directed are specified by address pointer 58b. Memory cell array 60b is composed of individual subarrays, one of which is 61b. All of the data bits of like weight (significance) for the frame which is being stored in memory cell array 60b are stored in the same subarray, one of which is 61b. When the system has finished displaying the contents of memory, 56a, the contents of memory 56b are sent to the system via the output bus 63b of memory cell array 60b and switch 64. In order to have color, this scheme could be duplicated as needed as with the decimation processor.

Figure 3B:
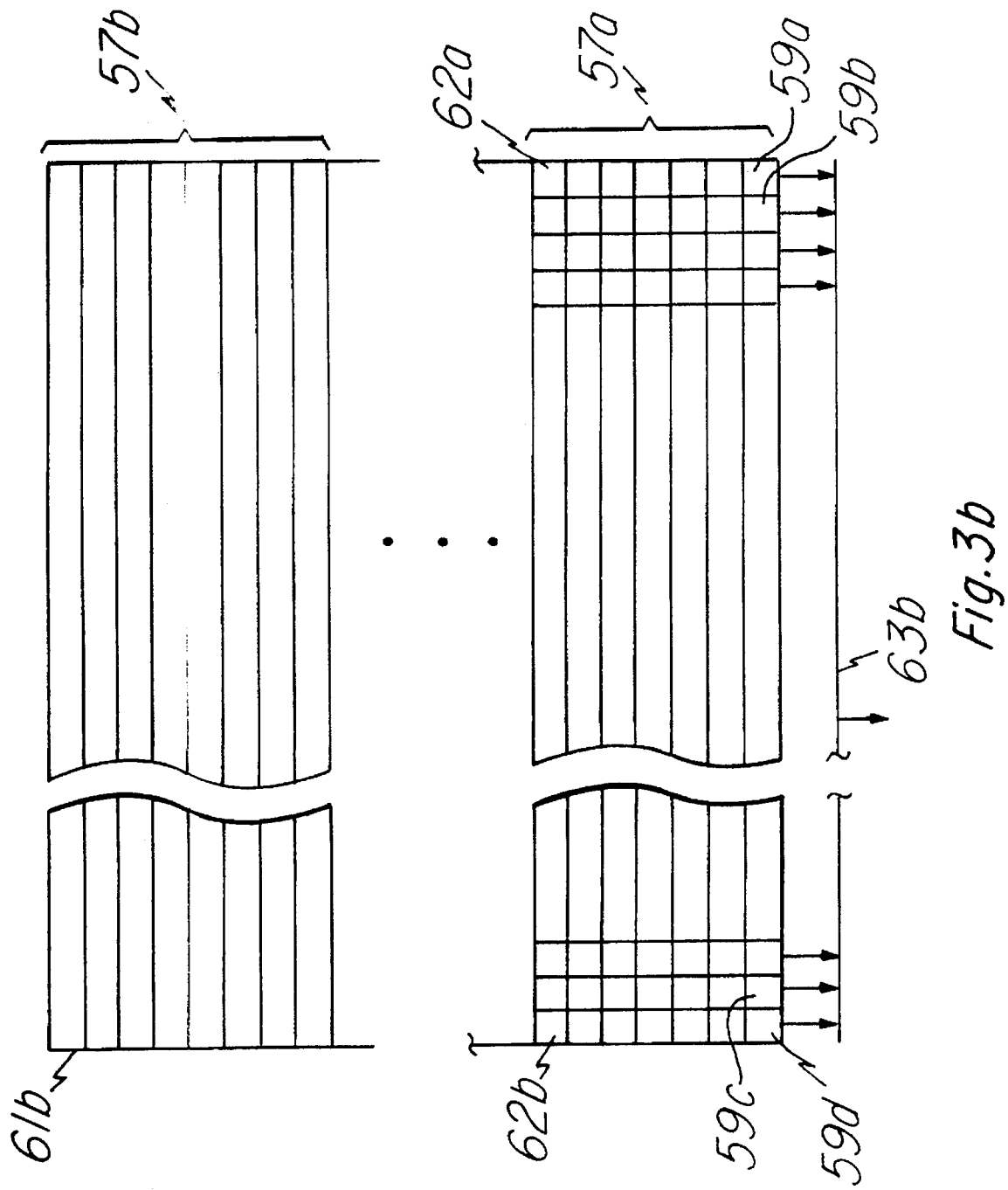

An exploded view of individual subarray 61b is shown in FIG. 3b. The subarray 61b is divided into rows of smaller cells. A group of rows 57a, or 57b, constitutes one video line of data. In this embodiment, where one half of a 1920×1080 array is addressed at one time, 57a represents line 1, and 57b represents line 540. Cell 59a holds the data for line 1, pixel 0. Cell 62a holds the data for line 1, pixel 7. The cells between them in the column hold data for pixels 1–6 for line 1. Similarly, cell 59b holds the data for pixel 8, line 1. Cell 59c holds the data for pixel 1904, line 1, and 59d holds the data for pixel 1912, line 1. The last pixel in line 1, pixel 1919 is held in cell 62b. The data is sent via bus 63b through switch 64 to the DMD array. This scheme is repeated for however many video lines are in the system, for each of the individual subarrays as shown in FIG. 3a.

Figure 3C:
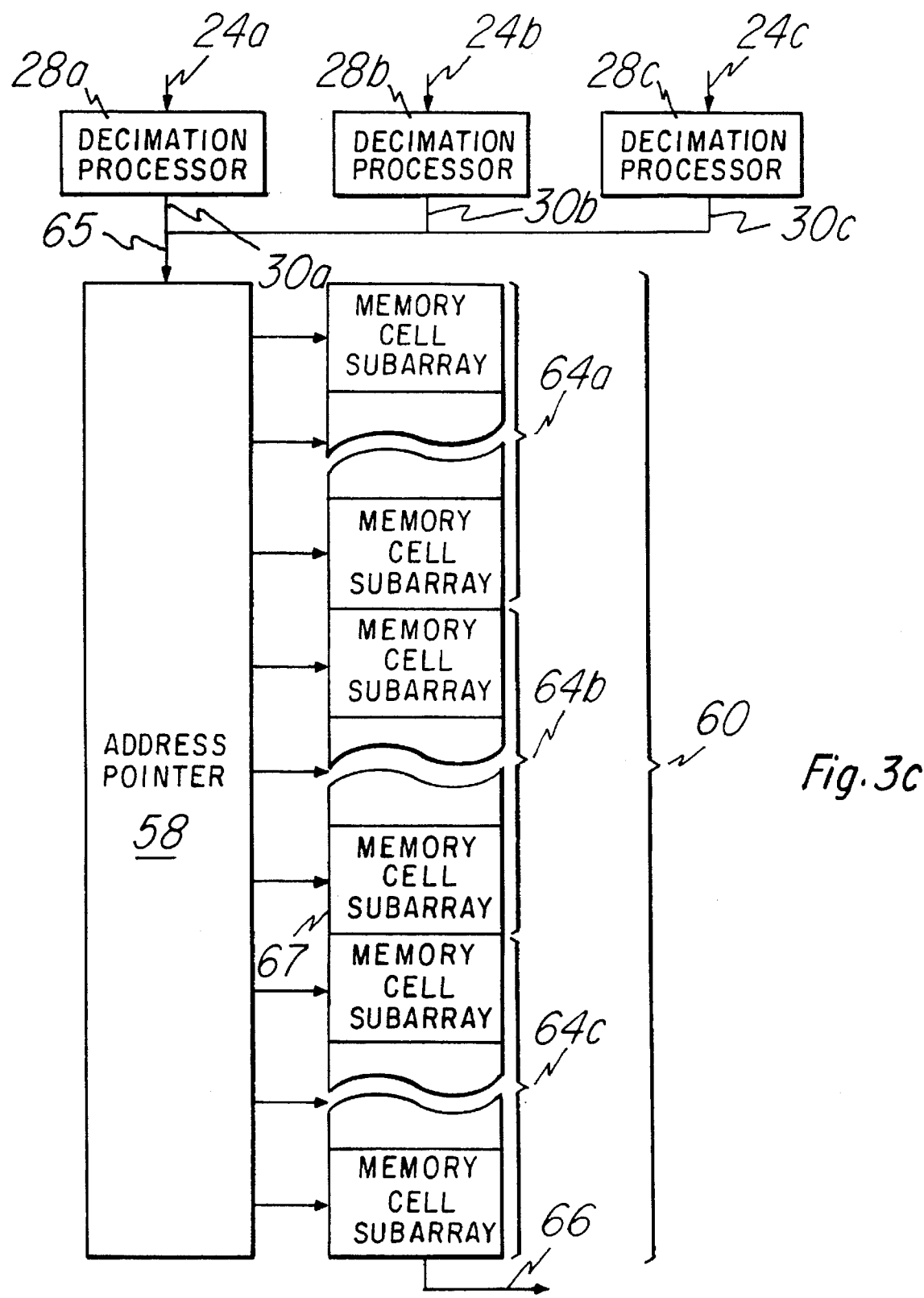

Another embodiment for a color system is shown in FIG. 3c. The video signal is fed into three decimation processors via lines 24a, 24b and 24c. Decimation processors 28a, 28b and 28c send the converted data along lines 30a, 30b and 30c to a bus line 65. The data on bus line 65 is loaded into the memory location specified by address pointer 58. Pointer 58 then loads the memory cell array 60 by color. The top third of the memory cell subarray 64a is for color 1, the second third 64b for color 2 and the bottom third 64c for color 3. Individual subarray 67, which is identical to the other subarrays shown, is similar to the detailed drawing in FIG. 3b. Data processed in this manner would lead to the sending of all three colors sequentially to the DMD circuitry.

Figure 4:
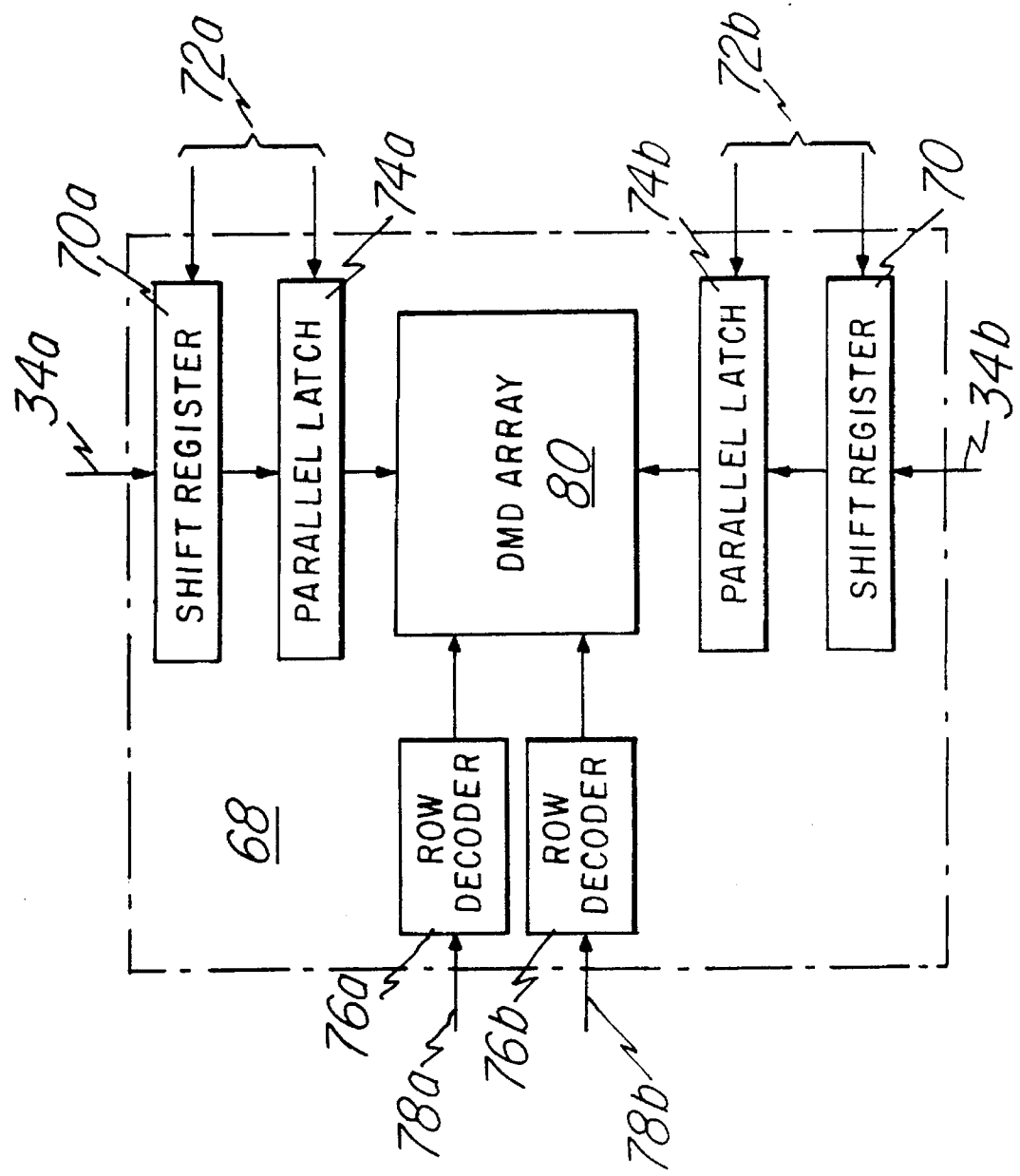
FIG. 4 shows a deformable mirror device (DMD) integrated circuit device.

One embodiment of the DMD integrated circuit is shown in FIG. 4. Data from the frame store circuitry 32 is passed to the integrated circuit device 68 via bus 34 in FIG. 1. Line 34 can actually be divided into two busses, 34a and 34b. Bus 34a conducts the data for the upper half of the DMD array, and bus 34b conducts the data for the lower half of the array mirrors. The data is sent to a shift register 70a. When the register is full, the data is then passed to a parallel latch 74a. The set of lines 72a controls the loading of the shift register and the parallel latch. After the data is latched, it travels to the upper half of a 1920×1080 array of the actual deformable mirror devices 80. The row of the addressing circuitry under the mirrors is selected by the row select line 78a through row decoder 76a. Simultaneously, the same operations are occurring in the lower half of the array. The mirrors of the array are then addressed and deflected to produce an image which is passed through optics to the viewer.

At this point the DMD display device consists of a DMD pixel array, input shift registers and latches, and row select decoders. The architecture is now modified to allow all of the pixels in a selected block of the DMD to be switched to the OFF state in a short amount of time, as shown in block form in FIG. 5. The parallel storage latches 74 are modified to include a CLEAR line 92 in FIG. 5. The CLEAR line causes the data driving the columns in the DMD array to be set to a state corresponding to the OFF pixel position when asserted. Additionally, the row select decoder 76 is modified to add a number of select lines which serve to cause one block of rows such as 90a to be selected at the same time.

To set a block of pixels to the OFF state, the CLEAR line 92 to the parallel storage latches 74 is asserted. Next, the block select line 84 for the block of pixel rows to be switched to the OFF state is asserted. Finally, a reset pulse is applied to the individual beam mirrors and the mirror are deflected to the OFF state. Although eight blocks of rows are shown in FIG. 5, with the rows of a given block being consecutive, there is no reason to be limited to this arrangement. The number of blocks may vary between 1 and the designer's imagination. Also, row of pixels in the blocks may be connected in an interleaved (or any other) configuration instead of consecutively.

Figure 6A:
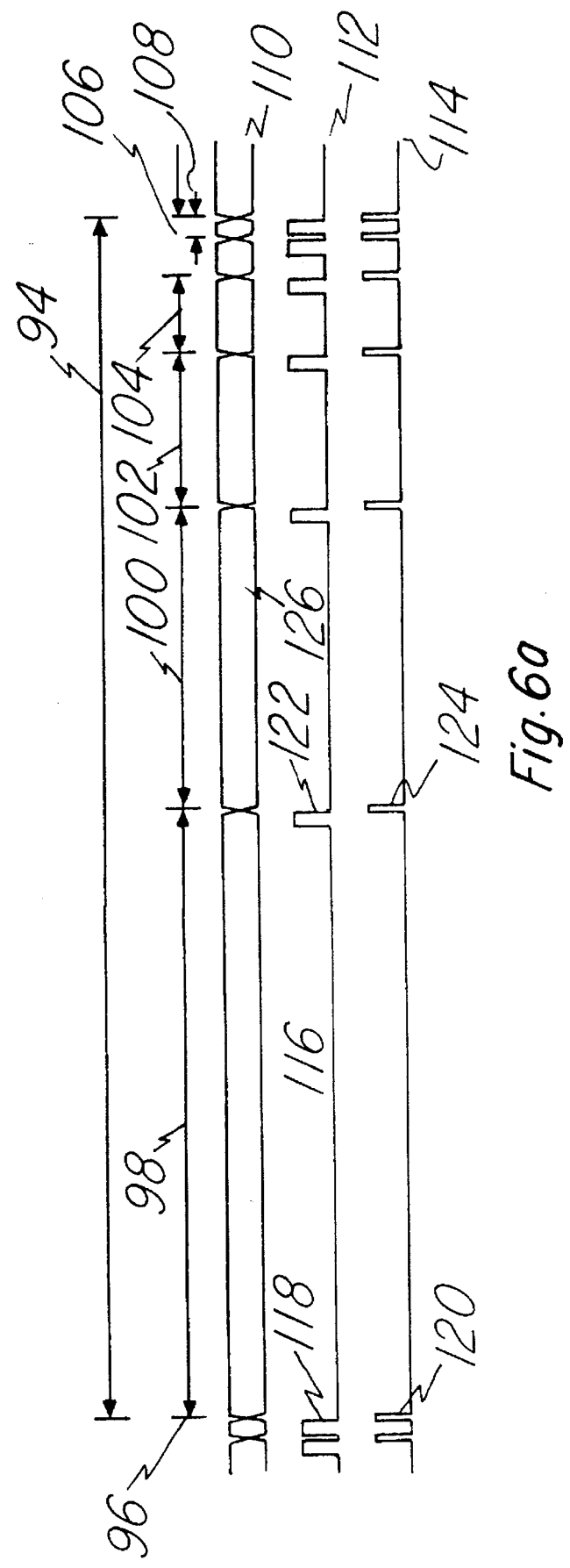
FIG. 6a shows the timing diagram for PWM addressing using decimated binary data.

In FIG. 6a, the timing diagram for a standard addressing scheme is shown. Line 94 denotes one frame time. Line 96 shows segments that correspond to the amount of time for each different binary weighting of the data. Segment 98 is the time period of display of the most significant bit (MSB) of the system. In this case, the MSB is bit 5, since this is a 6-bit system, which has a display time 98 of 32 LSB-times. Segment 100 is the time period of display for the next bit, bit 4, which has a display time of 16 LSB-times. Similarly, segment 102 is for bit 3, with a time of 8 LSB-times, segment 104 is for bit 2, with a time of 4 LSB-times, segment 106 is for bit 1, with a time of 2 LSB-times, and finally, time for bit 0 is shown in segment 108, with a time of 1 LSB-times.

The mirror state for the above time segments are shown on line 110. The data load pulses are shown on line 112 and the beam resets, which are applied to the metal of the beam to set them to the next state specified by the just-loaded data bits, are shown on line 114. Mirror state 116 is achieved by the following process. The data is loaded onto the electrodes for bit 5 during the time period shown by load pulse 118. The reset pulse 120 starts the frame time by resetting the mirrors to show the new data loaded during data load time 118. Thirty-one LSB times into the display time for bit 5, 116, the data for bit 4 is loaded during time 122. At the end of the data load time 122, which occurs at the same time as the end of the display time for bit 5, 116, the reset pulse 124 sets the mirrors to their new state for display time 126. This process is repeated for bits 3, 2, 1 and 0. The time to load and display one complete frame is a constant. In this example, the frame time 94 is divided into (32+16+8+4+2+1=63 LSB-times) so each LSB-time is 1/63 of the total frame time.

The minimum peak data rate is determined by the shortest time interval in which all of the bits of a given significance must be loaded onto the DMD array. In FIG. 6a the time to load all of the data for a given significance was one LSB-time. The collection of all data bits of the same binary weight from a given frame is referred to as a bit-frame. For a 6-bit system, there are 6 bit-frames of data per frame. It is desirable to reduce the peak data rate, most likely by sacrificing some other aspect of the DMD display system performance. FIG. 6b shows how this can be accomplished by using the block architecture shown in FIG. 5.

In FIG. 6b, the frame time is shown on line 128. The group of lines 130 constitute the timing diagram for the first block in the architecture, shown in FIG. 5 as block 90a. Line 132 is the mirror state, line 134 is the mirror reset pulse, line 136 indicates the addressing clear pulses and line 140 is the data load pulses. Note that when line 132 is shown to have the low state, as in segment 156, all of the mirrors are in the OFF state. The addressing clear pulses line 136 is a representation of the CLEAR line and block select sequence previously discussed in FIG. 5. This representation is used in FIGS. 6a, 6b and 7. Mirror display state 138 is achieved by loading the most significant bit of data, bit 5, for block 90a during load time 141, and resetting the mirrors to the new data with reset pulse 142. One LSB-time after the start of time 138, the MSB of data, bit 5, for block 90b has been loaded. The state of the mirrors 144 on line 146 for block 90b changes to that of the data just loaded after the reset pulse. The shifting in phase by 1 LSB-time of the loading and displaying of data is carried through the other blocks, 90c–90h as well.

At the time interval of 31 LSB-times, the data for bit 4 of block 90a is loaded during the time 148. The data loaded during time 148 corresponds to mirror display state 150. Beam reset 152 causes the mirrors to change to the data corresponding to state 150. The mirror state 150 is held for 16 LSB-times. This process is continued until mirror state 154, which is for block 90a, bit 2. Since the weighting for that pulse is only 4 LSB-times and it takes 8 LSB-times to load the whole device, (1 LSB-time per block), the data for bit 2, blocks 90e–90h has not been loaded yet. To accommodate this situation, the mirrors in block 90a are turned off for a period of 4 LSB-times, shown for block 90a as line segment 156. To achieve the OFF state, the address clear signal pulse 160 occurs and beam reset pulse 162 occurs to reset the mirrors to the OFF state. The mirrors remain OFF for 4 LSB-times. Three LSB-times into that period, the data for bit 1, block 90a is loaded in during time 164. The process repeats for this bit and the next with the OFF times increasing to 6 LSB-times for bit 1 and 7 LSB-times for bit 0. Therefore, the total frame time to load and display one frame of data is now the 63 LSB-times from the standard addressing scheme discussed above, plus 4 OFF LSB-times, plus 6 OFF LSB-times, plus 7 OFF LSB-times, totaling 80 LSB-times. Since, the frame time is a constant, the LSB-time in this example is 1/80 of the total frame time, making the LSB-time in this example shorter than the LSB-times for FIG. 6a. The addressing scheme shown in FIG. 6b reduces the peak data rate, nominally by a factor of 8. This is due to the fact that only 1/8 as many pixels are loaded in 1 LSB time in FIG. 6b as are loaded in 1 LSB time in FIG. 6a. However, although the frame times in FIG. 6a and FIG. 6b are equal, the corresponding LSB times are not. In FIG. 6a, the LSB time is 1/63 of the frame time, while in FIG. 6b the LSB time is 1/80 of the frame time. As a result of the difference in LSB times, the actual reduction in data rate resulting from using the addressing scheme in FIG. 6b instead of that in FIG. 6a is $8:1 \times (63/80) \approx 6.3:1$.

Although the addressing scheme shown in FIG. 6b has reduced the peak data rate considerably, this reduction has occurred at the expense of optical efficiency. In FIG. 6a. if a pixel were at maximum brightness, it would be on for 63 out of 63 LSB times, which is a 100% addressing efficiency. However, using the addressing scheme of FIG. 6b, if a pixel were at maximum brightness, it would only be on for 63 out of 80 LSB times because the pixels are always off for 17 LSB times, resulting in an optical efficiency of approximately 79%.

Figure 7:
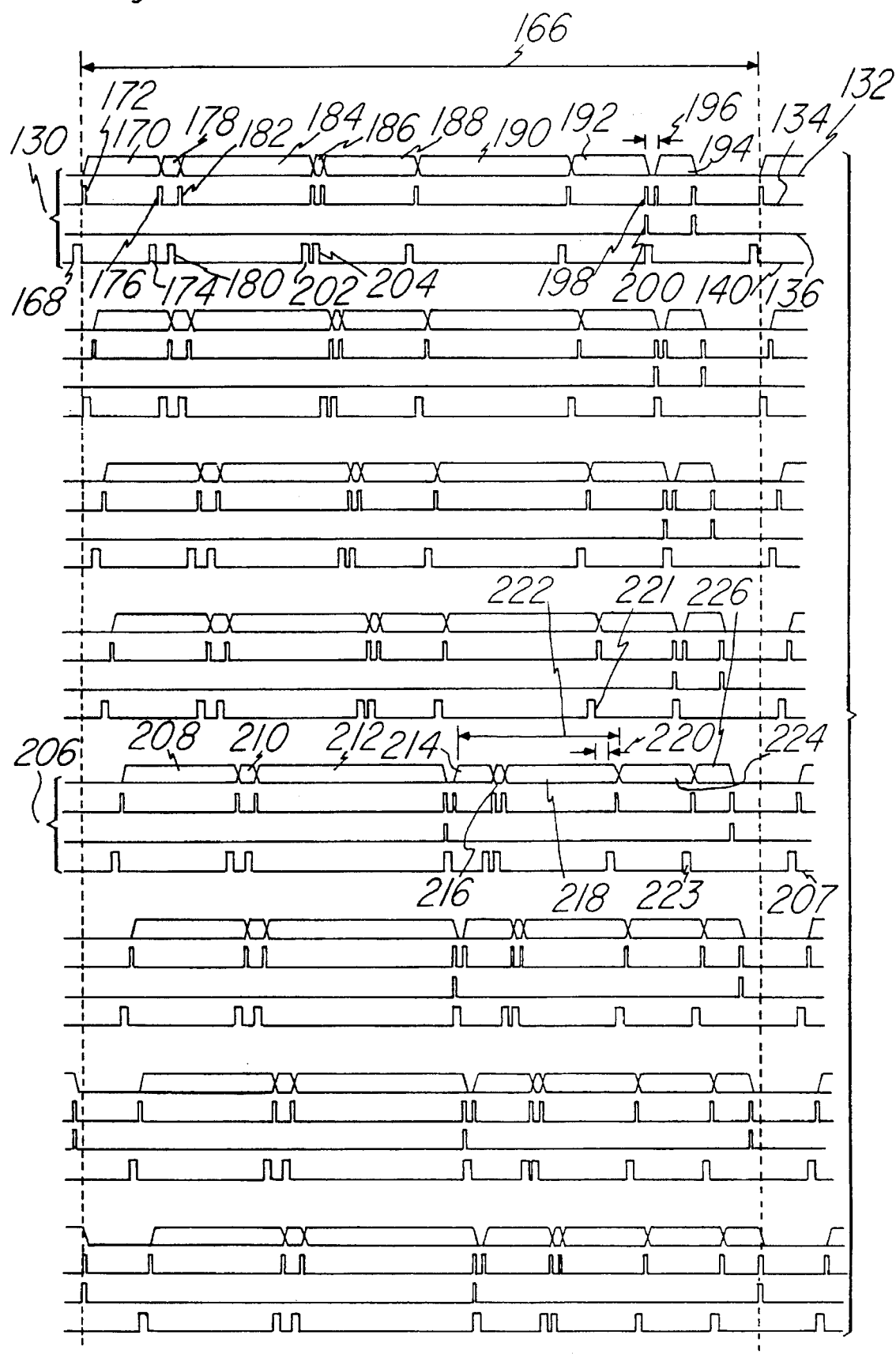
FIG. 7 shows a timing diagram for bit-period sharing addressing, using a block clearing architecture.

It is desirable to boost the optical efficiency of the addressing scheme of FIG. 6b while maintaining the decreased peak data rate into the DMD. One way to boost the optical efficiency of the scheme of FIG. 6b is to reduce the number of LSB times when the mirrors are always off. FIG. 7 is a slight modification to FIG. 6b which accomplishes this goal. As a side benefit, there is also a slight decrease in the peak data rate of the scheme of FIG. 6b. In FIG. 7, the frame time is represented by line 166. The group of lines 130 again show the significant signals for block 1. Line 132 is again the mirror state, line 134 is the beam reset, line 136 is the address clear, and line 140 is the data load line. In this scheme, the data for bit 5, the MSB is loaded during time 168, the mirrors are reset with pulse 172 and the data is displayed during mirror state 170 for 8 LSB-times. Seven LSB-times into the display period, the data for bit 1 is loaded during time 174 and set on the mirrors with reset pulse 176. The data is displayed for mirror state time 178 which completes the required time for bit 1 of 2 LSB-times. The data for bit 5 is then reloaded onto the mirrors at time 180 and the mirror state is caused to change back to the bit 5 state by reset pulse 182. The data for bit 5 is displayed for mirror state time 184 which is equal to 16 LSB-times. So at this point data for bit 5 has been displayed for 24 LSB-times, which is three-Fourths of the total requirement. The data for bit 0 is loaded with pulse 202 and displayed for 1 LSB-time 186 completing the requirement for bit 0. Data for bit 5 is then reloaded again during time 204 and displayed during mirror state time 188 and displayed for 8 LSB-times, raising its total display time to 32 LSB-times, thereby completing its requirement as specified by its binary weight. Mirror display time 190 is for bit 4, display time 192 is for bit 3, and display time 194 is for bit 2. This completes the requirements for all of the bits to be displayed for their proper amount of time, according to their binary weighting.

The timing diagrams for blocks 90a–90d are the same except they are shifted in phase. This is not true when comparing blocks 90a–90d with blocks 90e–90h. The timing diagram for block 90e is denoted by the group of lines 206. Since the data is loaded and displayed in the same manner as in all of the other blocks, only line 207 will be discussed. Mirror display time 208 is for bit 5, which is displayed for 8 LSB-times. Similar to block 1, the data for bit 1 is loaded and displayed for time 210 which is 2 LSB-times, thereby completing its requirement. Segment 212 is for the display of bit 5 again, which is displayed for 24 LSB-times, which completes its requirement. Note that this is different than block 1. Time 222 on the diagram denotes the total time it takes to display bit 4. Bit 4 is displayed for 4 LSB-times in segment 214, but then the data for bit 0 is loaded and displayed for 1 LSB-time. Bit 4 is reloaded and displayed for its remaining requirement, 12 LSB-times in segment 218. The result of this is that time 222 is 17 LSB-times, not 16 as is standard. This longer time is accounted for by gap 220 between load pulses 221 and 223, on block 90d and 90e respectively. This gap is also accounted for in blocks 90a–90c. Looking at block 90a. a gap 196 can be seen between segment 192 and 194. This is caused by the fact that bit 2 cannot be loaded until bit 3 is completely loaded. Bit 3 is not loaded in block 8 until 8 LSB-times later, because of the gap caused in block 5 by the loading of bit 0 data during the display of bit 4 data. The resultant total display time is 71 LSB-times, which is shorter than the scheme discussed in FIG. 6b, and has a lower data rate than the scheme is FIG. 6a. There is also a significantly higher number of reset pulses associated with this method.

Figure 8:
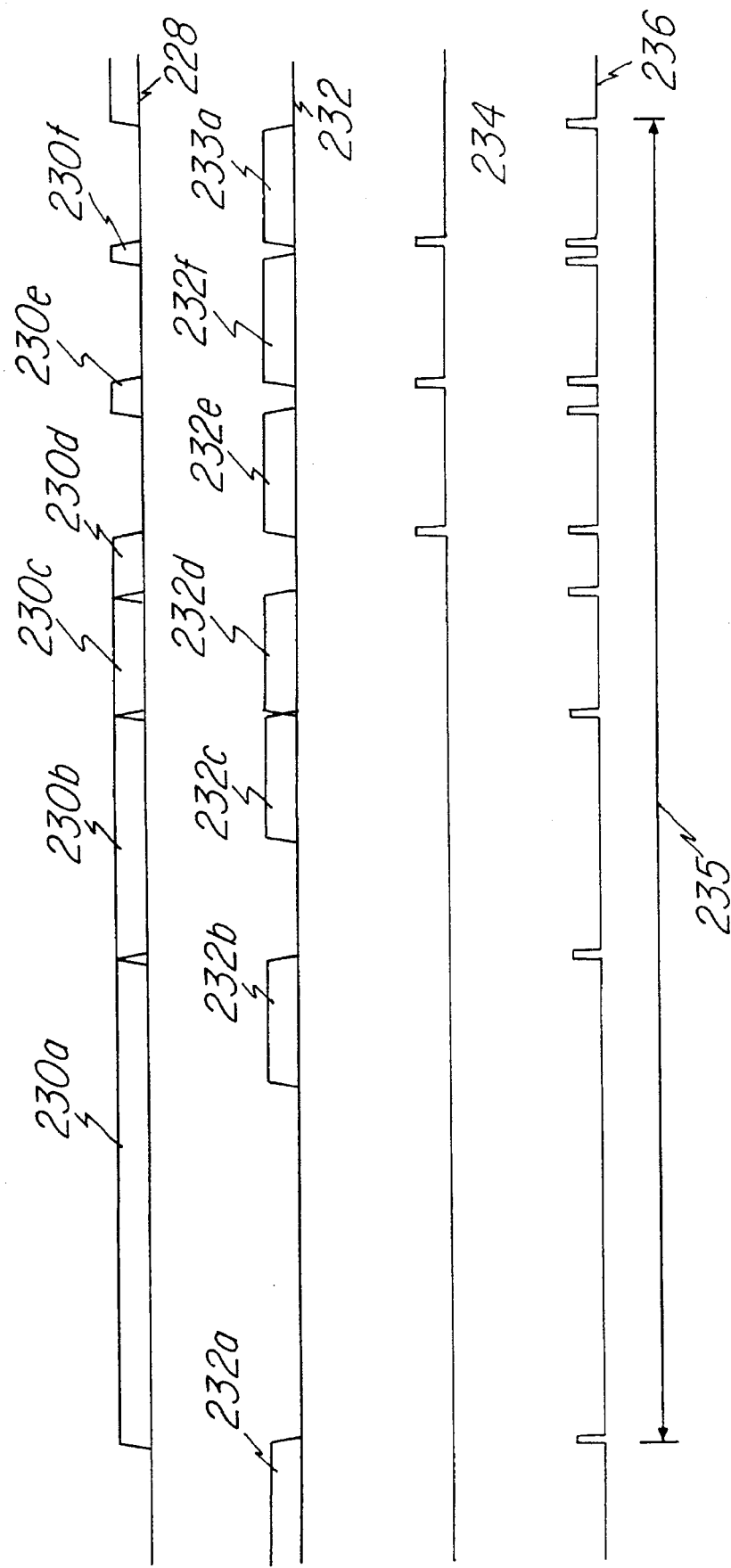
FIG. 8 shows a timing diagram for total addressed reset addressing.

It is desirable to avoid the effects associated with a multitude of reset pulses in a given frame time, so a method of addressing the DMD is desirable which avoids these potential effects. FIG. 8 shows one such method, referred to as the total addressed reset (TAR) method. There are three primary differences from this method and the bit-period sharing method discussed above.

First, in the TAR method the whole DMD is loaded with the bit-frame data for a particular bit before a reset pulse is applied to the pixels, while the bit-period method loads a part of the DMD (one block) and then a reset is applied. Second, in the TAR method the whole device is loaded in 8 LSB times. In the previous method, the whole device was loaded in 8 intervals of one bit-frame each, resulting in the same overall data load time.

In FIG. 8, line 228 shows what mirror state the viewer sees. The viewer sees bit 5 230a being on for a period of time that is equivalent to 32 LSB-times, followed by bit 4 230b for half of the time of bit 5. The pattern continues until it reaches the point of time between bits 2 230d and 1 230e. At this point there is actually a period of all of the mirrors being OFF. Of course, in reality the viewer cannot actually see this because it is a far higher frequency than the critical flicker frequency of the human eye. After the appropriate amount of time, bit 0 230f is displayed.

Line 232 is the timing of the data loading. Each of the loading times, 232a–232f is equal to 8 LSB-times. Bit 5

232a is loaded just before display time for bit 5 shown on line 228. Similarly, all bits are loaded just previous to the display time on line 228. The loading intervals are the same for each bit. Line 234 is the address reset line and 236 is the beam reset line. The address reset is for resetting all the pixels in the array in a short amount of time. There is a considerable reduction in the number of reset pulses sent to the beams. This eliminates wear and tear on the mechanical parts of the beams.

Figure 9:
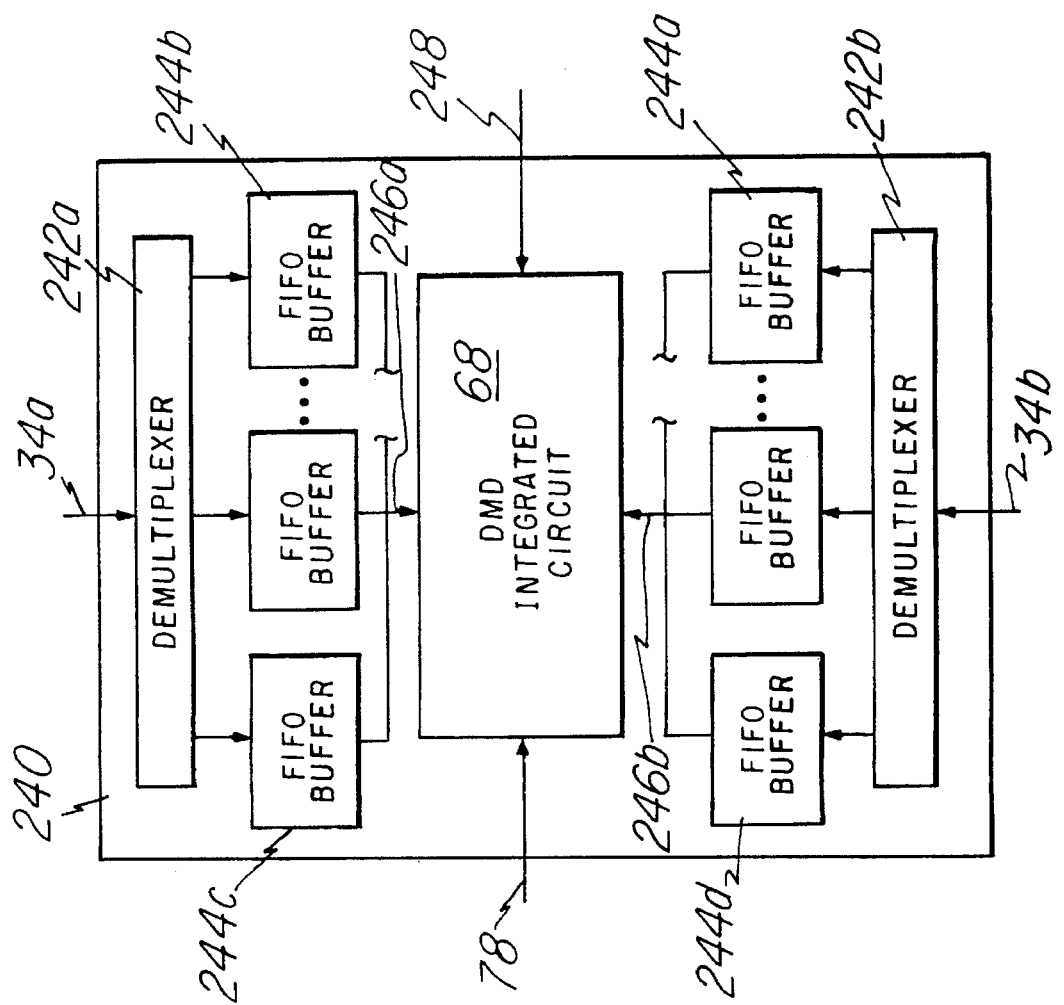
FIG. 9 shows a diagram of a DMD superstrate with an integrated circuit device.

An architecture that allows the above discussed processes to be implemented is shown in FIG. 9. The simple DMD chip 68 from FIG. 4 has become one part of the DMD superstrate 240. Lines 34a and 34b come into the circuit via demultiplexers (8:128) 242a and 242b. The resultant signals are sent out in 16-bit lines to First-In First-Out (FIFO) buffers 244a through 244d and 244b through 244c. The outputs of the FIFOs are transferred to the DMD chip via lines 246a and 246b. Control signals enter the DMD chip via line 78, line select, and line 248, frame reset.

Figure 10:
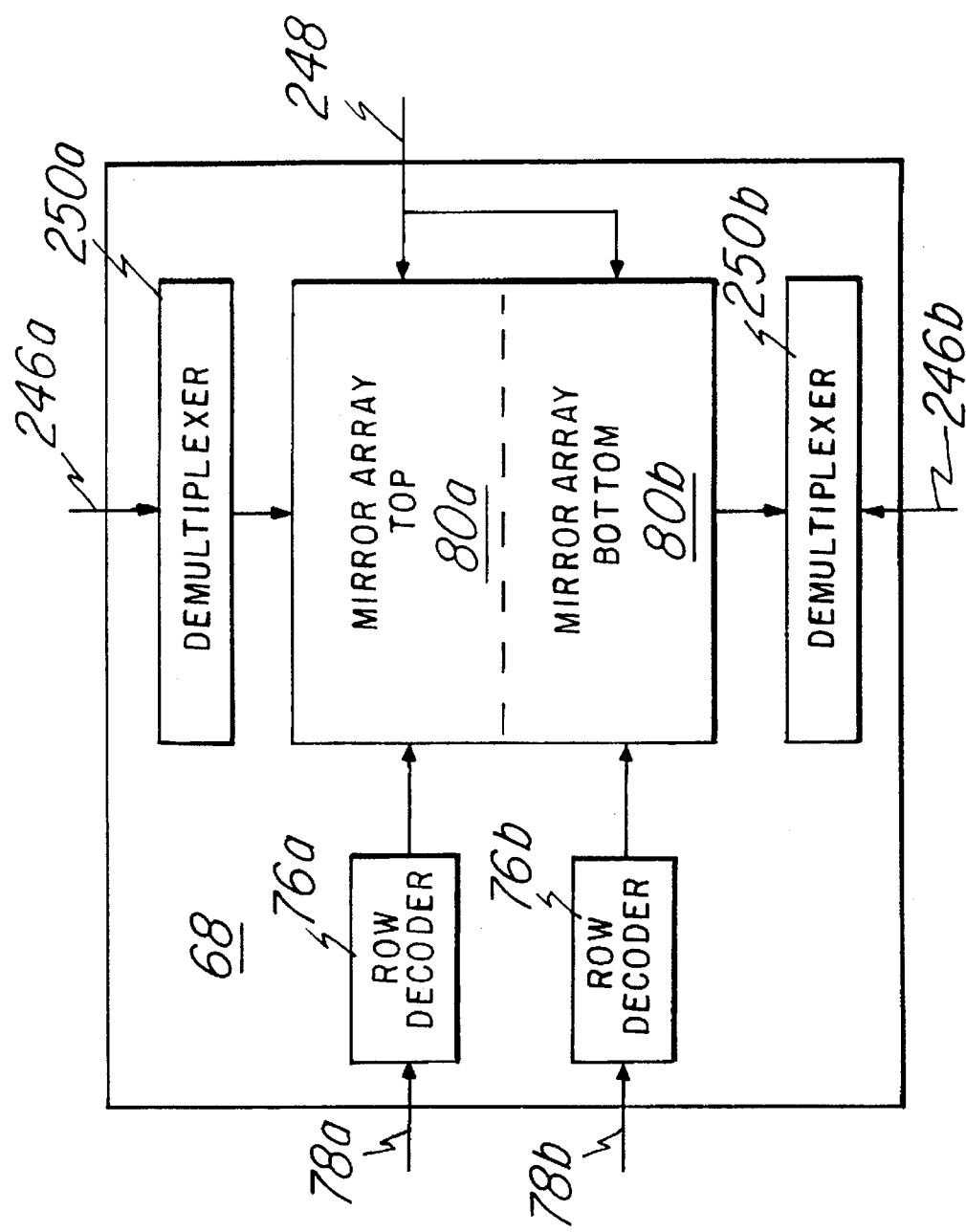
FIG. 10 shows an exploded view of a DMD integrated circuit device.

An exploded view of the DMD device 68 is shown in FIG. 10. Data from the bus lines 246a and 246b enter the mirror arrays 80a and 80b via the demultiplexers (1:8×128) 250a and 250b. Line select signal 78 is divided into a lower line select which enters the decoder for the lower array 76b and a upper line select which enters the upper array decoder 76a. The frame reset signal on line 248 is also divided to access lower mirror array 80b and upper mirror array 80a. This revised architecture can support the different addressing schemes discussed above, in addition to many others, making the device much more versatile and adaptable.

Figure 11:
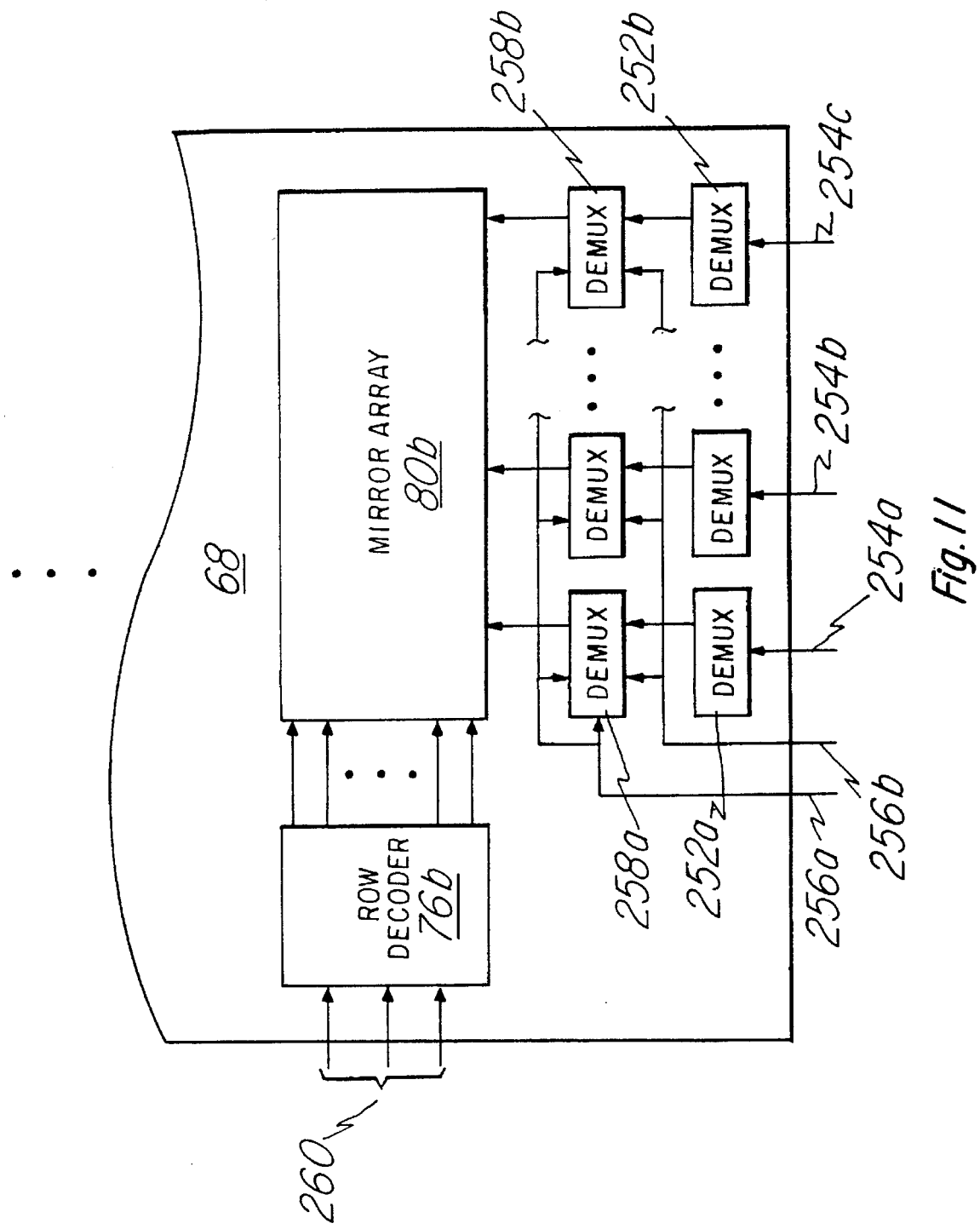
FIG. 11 shows an example of forced data and multiple simultaneous row addressing enhancements.
Figure 12:
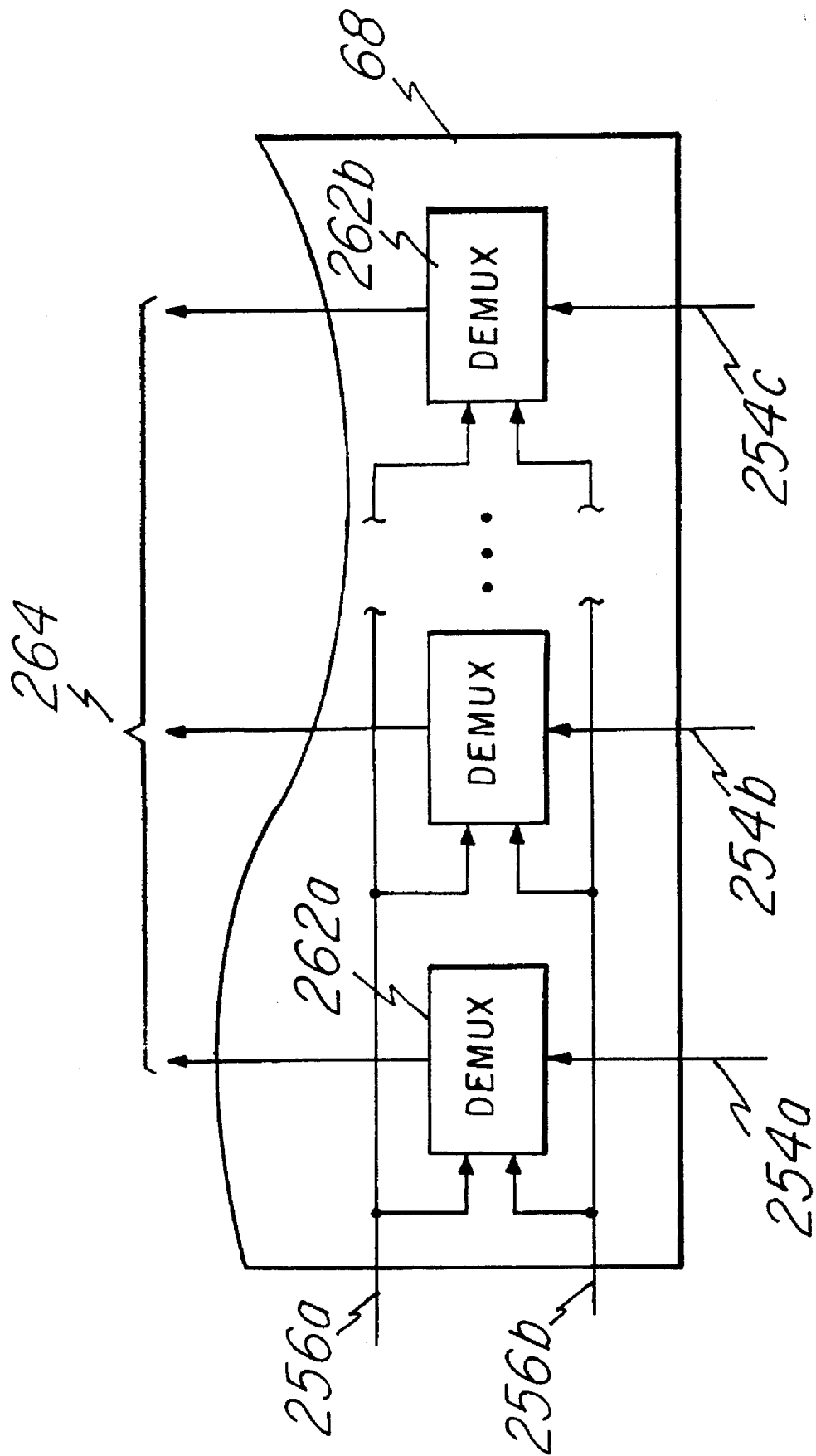
FIG. 12 shows an alternative approach for a forced data addressing enhancement.

Additional enhancements may be made to the above architecture to increase the speed. One of such enhancements is to have a data input structure such that either the normal input data may be selected or a constant input data may be selected. Such an enhancement is shown in FIG. 11. For normal data input, where the data is unique, the output from the input data multiplexers 252a through 252b which are fed through lines 254a through 254c, is selected to drive the array columns. For forced data input, where the data is constant from pixel to pixel, the forced data on lines 256a and 256b is applied to the columns. Selection of this data is accomplished by multiplexers 258a and 258b. This allows constant data to be applied to the rows of the DMD mirror array (shown as the lower array) 80b at a rate which is limited by the speed of the forced data multiplexer and the row select decoder 76b with input lines 260 which are control signals determining multiple or individual row selections.

A similar enhancement allows multiple rows to be addressed simultaneously by constructing the decoder such that rows may be addressed on a time or in groups. The grouping is arranged for the maximum benefit of the given application. Thus, the grouping may be such that any number and combination of rows may be addressed as a single group, and any number of groups may be defined. This definition of groups then specifies the decoder construction.

Thus, although there has been described to this point a particular embodiment for a display system and its architecture, it is not intended that such specific references be considered as limitations upon the scope of this invention except in-so-far as set forth in the following claims.

We claim:

1. A projection system comprising:

a. a decimation processor comprising at least one input shift register, at least one shadow memory connected to said input shift register, and at least one output shift register connected to said shadow memory;

b. at least one memory cell array for receiving data from said output shift register; and c. a spatial light modulator for receiving data from said memory cell array.

2. The projection system of claim 1 wherein said at least one memory cell array comprises a first and a second memory cell array.

3. The projection system of claim 2 further comprising a switchable bus connected between said decimation processor and said first and said second memory cell arrays, said bus for alternately connecting said first and said second memory cell array to said decimation processor.

4. The projection system of claim 2 further comprising a switchable bus connected between said first and said second memory cell arrays and said spatial light modulator, said bus for alternately connecting said first and said second memory cell array to said spatial light modulator.

5. The projection system of claim 2 further comprising:

a first switchable bus connected between said decimation processor and said first and said second memory cell arrays, said first switchable bus for alternately connecting said first and said second memory cell array to said decimation processor;

a second switchable bus connected between said first and said second memory cell arrays and said spatial light modulator, said second switchable bus for alternately connecting said first and said second memory cell array to said spatial light modulator; and wherein said first switchable bus and said second switchable bus are coordinated such that said first memory cell array receives data from said output shift register while said spatial light modulator receives data from said second memory cell array.

6. A decimation processor comprising:

an n-bit wide input bus;

an n-bit wide and m-bit deep input register for receiving a block of data from said input bus, said block of data being comprised of m input data words, each input data word being n-bits wide;

an n-bit wide and m-bit deep shadow RAM for receiving said block of data from said input register; and an m-bit wide output bus for allowing said block of data to be read out of said shadow RAM in n output words wherein each said output word is m-bits wide and is comprised of one bit from each of said m input words.

7. The decimation processor of claim 6 further comprising:

an output register for receiving said m-bit output word in parallel from said output bus.

8. The decimation processor of claim 7 wherein said output register is an array of i output shift registers each being j-bits wide, said output shift registers receiving said m-bit output words in parallel from said output bus and outputting said m-bits in the form of j output data words, each said output data word being i-bits wide.

9. The decimation processor of claim 7 wherein said output register is a multiplexer.

10. The decimation processor of claim 7 wherein said output register is an array of i multiplexers, each said multiplexer being j-bits wide, said multiplexers receiving said m-bit output words in parallel from said output bus and outputting said m-bits in the form of j i-bit output data words.

* * * * *